US012572487B2

(12) United States Patent
Saeki et al.

(10) Patent No.: US 12,572,487 B2
(45) Date of Patent: Mar. 10, 2026

(54) I/O UNIT, MASTER UNIT, AND COMMUNICATIONS SYSTEM

(71) Applicant: FANUC CORPORATION, Minamitsuru-gun (JP)

(72) Inventors: Masahiro Saeki, Yamanashi-ken (JP); Shinichi Kuwahata, Yamanashi-ken (JP); Asunaro Maeda, Yamanashi-ken (JP)

(73) Assignee: FANUC CORPORATION, Minamitsuru-gun (JP)

( * ) Notice: Subject to any disclaimer, the term of this patent is extended or adjusted under 35 U.S.C. 154(b) by 20 days.

(21) Appl. No.: 18/282,297

(22) PCT Filed: Mar. 11, 2022

(86) PCT No.: PCT/JP2022/010775
§ 371 (c)(1),
(2) Date: Sep. 15, 2023

(87) PCT Pub. No.: WO2022/202388
PCT Pub. Date: Sep. 29, 2022

(65) Prior Publication Data
US 2024/0160591 A1 May 16, 2024

(30) Foreign Application Priority Data
Mar. 24, 2021 (JP) ................................. 2021-050003

(51) Int. Cl.
*G06F 13/362* (2006.01)

(52) U.S. Cl.
CPC .................................. *G06F 13/362* (2013.01)

(58) Field of Classification Search
CPC ....................................................... G06F 13/362
(Continued)

(56) References Cited

U.S. PATENT DOCUMENTS

| | | | | | |
|---|---|---|---|---|---|
| 4,004,277 | A | * | 1/1977 | Gavril | G06F 15/16 710/23 |
| 4,914,625 | A | * | 4/1990 | Billian | G06F 13/37 709/239 |

(Continued)

FOREIGN PATENT DOCUMENTS

| | | |
|---|---|---|
| JP | 9-244772 A | 9/1997 |
| JP | 09-247766 A | 9/1997 |

(Continued)

OTHER PUBLICATIONS

International Search Report for PCT/JP2022/010775 dated May 17, 2022.

*Primary Examiner* — Paul R. Myers
(74) *Attorney, Agent, or Firm* — Sughrue Mion, PLLC

(57) ABSTRACT

An I/O unit comprises: a preceding stage-side mainstream terminal and a preceding stage-side branch terminal that are connected to preceding-stage master units; a next stage-side branch terminal that is connected to the preceding-stage branch terminal and connected to another I/O unit; a slave processing circuit that is connected to the preceding stage-side branch terminal and the next stage-side branch terminal; and a next stage-side mainstream terminal connected to the preceding stage-side mainstream terminal and a master unit in the next stage.

7 Claims, 3 Drawing Sheets

LEGEND:
12: Coupler Unit   14: Interface Unit   16, 16a, 16b: I/O Unit   18, 18a, 18b: Master processing Circuit   20: Power
22: Connector   24, 26, 34, 36, 38, 40, 44: Terminals   30, 30a, 30b: Slave processing Circuit   32: Interface
102: Control device   104: Device   Lb1, Lb2: Branch Line

(58) Field of Classification Search
USPC ........................................................ 710/110
See application file for complete search history.

(56) References Cited

U.S. PATENT DOCUMENTS

| | | | | |
|---|---|---|---|---|
| 4,933,838 | A * | 6/1990 | Elrod .................. | G06F 11/2005 |
| | | | | 714/3 |
| 5,115,235 | A * | 5/1992 | Oliver ................. | G06F 13/4022 |
| | | | | 340/9.1 |
| 5,296,936 | A * | 3/1994 | Pittas ....................... | G09B 5/14 |
| | | | | 358/404 |
| 5,450,393 | A * | 9/1995 | Watanabe ......... | H04L 12/40006 |
| | | | | 375/257 |
| 6,226,723 | B1 * | 5/2001 | Gustavson ........... | G11C 7/1072 |
| | | | | 711/170 |
| 6,680,904 | B1 * | 1/2004 | Kaplan ................... | H04L 12/56 |
| | | | | 370/465 |
| 7,480,753 | B2 * | 1/2009 | Bohm ................. | G06F 13/4022 |
| | | | | 710/313 |
| 7,692,929 | B2 * | 4/2010 | Coutancier ......... | G06F 13/4243 |
| | | | | 361/761 |
| 8,447,890 | B1 * | 5/2013 | LeTourneur ........ | G06F 13/4022 |
| | | | | 710/63 |
| 8,700,845 | B1 * | 4/2014 | Bowers ............... | G11C 7/1003 |
| | | | | 711/E12.001 |
| 2003/0088655 | A1 * | 5/2003 | Leigh ................... | H04L 67/565 |
| | | | | 709/208 |
| 2003/0123473 | A1 * | 7/2003 | Satoh ................... | G06F 13/372 |
| | | | | 370/442 |
| 2003/0133447 | A1 * | 7/2003 | Benayoun ............. | H04L 49/351 |
| | | | | 370/360 |
| 2003/0174724 | A1 * | 9/2003 | Olson ................. | G06F 13/4072 |
| | | | | 370/420 |
| 2004/0008256 | A1 * | 1/2004 | Kim ....................... | H04N 7/181 |
| | | | | 348/E7.086 |
| 2004/0071389 | A1 * | 4/2004 | Hofmeister ............ | H04B 10/40 |
| | | | | 385/16 |
| 2006/0095592 | A1 * | 5/2006 | Borkenhagen ...... | G06F 13/1684 |
| | | | | 710/2 |
| 2006/0206650 | A1 * | 9/2006 | Chang ................. | G06F 13/4027 |
| | | | | 710/306 |
| 2009/0151382 | A1 * | 6/2009 | Okano ..................... | F24F 11/62 |
| | | | | 62/259.1 |
| 2009/0268743 | A1 * | 10/2009 | Chang ................. | G06F 13/4045 |
| | | | | 370/401 |
| 2010/0191894 | A1 * | 7/2010 | Bartley ............... | G06F 13/1684 |
| | | | | 711/E12.082 |
| 2011/0153889 | A1 * | 6/2011 | Barrenscheen ....... | H04L 12/403 |
| | | | | 710/110 |
| 2012/0166695 | A1 * | 6/2012 | Venus ................. | G06F 13/4256 |
| | | | | 710/110 |
| 2013/0019035 | A1 * | 1/2013 | Chang ................... | G06F 13/385 |
| | | | | 710/63 |
| 2013/0057339 | A1 * | 3/2013 | Koudar ............... | G06F 13/4252 |
| | | | | 327/565 |
| 2013/0132633 | A1 * | 5/2013 | Kim Yeung ............ | G06F 13/36 |
| | | | | 710/306 |
| 2013/0159593 | A1 * | 6/2013 | Yeung ................. | G06F 13/4022 |
| | | | | 710/316 |
| 2013/0297829 | A1 | 11/2013 | Berenbaum et al. | |
| 2014/0032802 | A1 * | 1/2014 | Sip ......................... | G06F 13/364 |
| | | | | 710/110 |
| 2014/0047138 | A1 * | 2/2014 | Sip .......................... | G06F 13/36 |
| | | | | 710/36 |
| 2014/0047145 | A1 * | 2/2014 | Sip ......................... | G06F 13/385 |
| | | | | 710/313 |
| 2015/0227485 | A1 * | 8/2015 | Maung ................ | G06F 13/4022 |
| | | | | 710/316 |
| 2016/0098371 | A1 * | 4/2016 | Murtaza .............. | G06F 13/4068 |
| | | | | 710/110 |
| 2016/0132448 | A1 * | 5/2016 | Maung ................ | G06F 13/4068 |
| | | | | 710/104 |
| 2017/0250833 | A1 * | 8/2017 | Morizono ............... | H04L 12/28 |
| 2018/0052799 | A1 * | 2/2018 | Shetty ................. | G06F 13/4022 |
| 2018/0278352 | A1 * | 9/2018 | Hoshino .............. | H04L 25/20 |
| 2019/0028146 | A1 * | 1/2019 | Morgan ................ | H04B 5/263 |
| 2019/0097836 | A1 * | 3/2019 | Huber ................... | H04L 12/403 |
| 2019/0243793 | A1 | 8/2019 | Karb et al. | |
| 2019/0317587 | A1 | 10/2019 | Hsu | |
| 2020/0083720 | A1 * | 3/2020 | Kain ....................... | B60L 58/22 |
| 2020/0333758 | A1 | 10/2020 | Kretschmann | |
| 2021/0041035 | A1 | 2/2021 | Sakamura et al. | |
| 2021/0167688 | A1 * | 6/2021 | Hureau .............. | H02M 3/1584 |
| 2022/0221894 | A1 * | 7/2022 | Striewe .................... | G06F 1/06 |

FOREIGN PATENT DOCUMENTS

| | | |
|---|---|---|
| JP | 2002-091519 A | 3/2002 |
| JP | 2011-130307 A | 6/2011 |
| JP | 2016-110460 A | 6/2016 |
| JP | 2018-157456 A | 10/2018 |
| JP | 2019-114085 A | 7/2019 |
| JP | 2021-002172 A | 1/2021 |
| TW | 201944418 A | 11/2019 |

* cited by examiner

LEGEND
18: Master Processing Circuit    30: Slave Processing Circuit    32: Interface    102: Control Device
104a: Output Device    104b: Input Device    108a, 108b: I/O Unit
106, 106a, 106b: Coupler Unit    Lb1, Lb2: Branch Line LEGEND:
12: Coupler Unit          14: Interface Unit          16, 16a, 16b: I/O Unit          18, 18a, 18b: Master processing Circuit          20: Power
22: Connector             24, 26, 34, 36, 38, 40, 44: Terminals          30, 30a, 30b: Slave processing Circuit          32: Interface
102: Control device       104: Device          Lb1, Lb2: Branch Line

FIG. 3

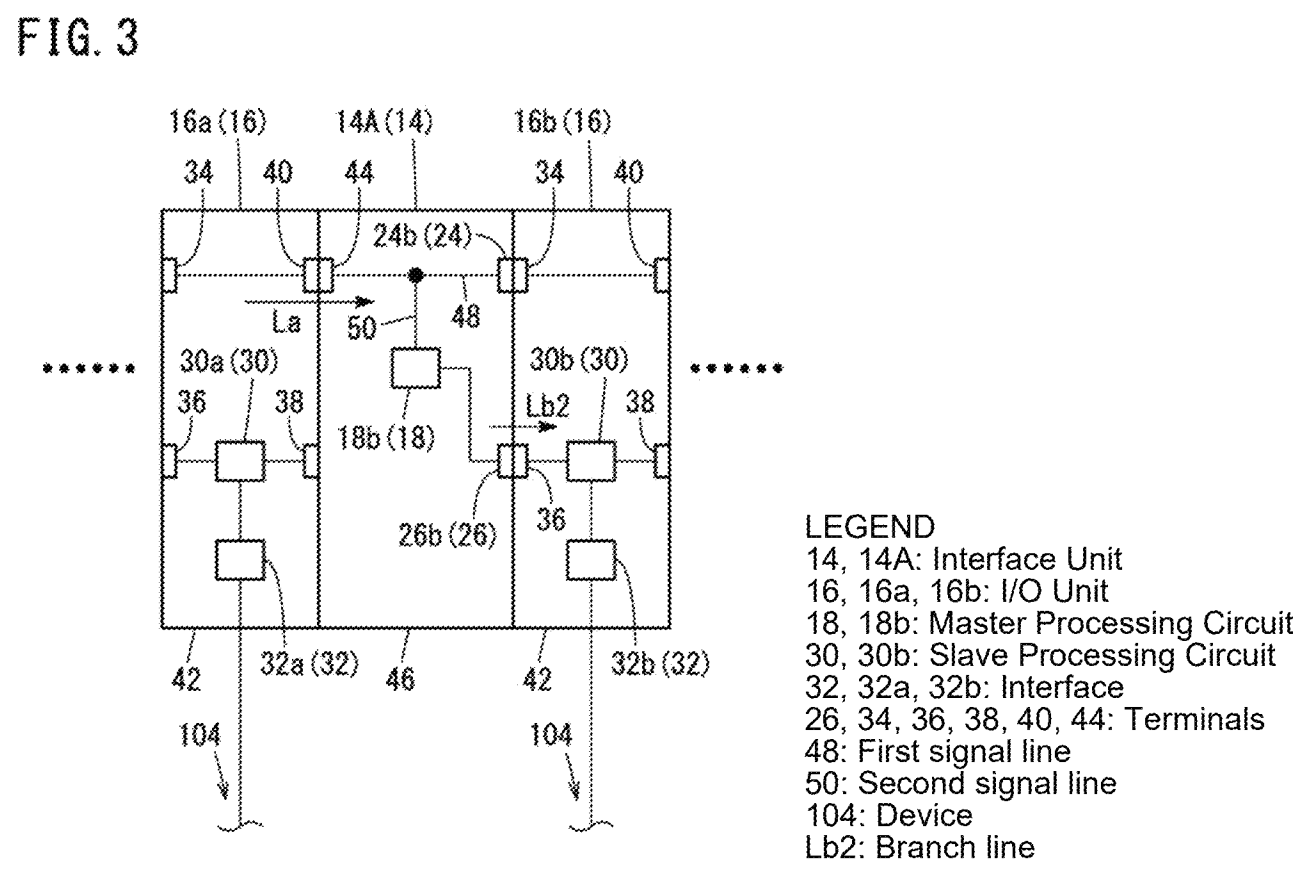

LEGEND
14, 14A: Interface Unit
16, 16a, 16b: I/O Unit
18, 18b: Master Processing Circuit
30, 30b: Slave Processing Circuit
32, 32a, 32b: Interface
26, 34, 36, 38, 40, 44: Terminals
48: First signal line
50: Second signal line
104: Device
Lb2: Branch line

I/O UNIT, MASTER UNIT, AND COMMUNICATIONS SYSTEM

CROSS REFERENCE TO RELATED APPLICATIONS

This application is a National Stage of International Application No. PCT/JP2022/010775 filed Mar. 11, 2022, claiming priority based on Japanese Patent Application No. 2021-050003 filed Mar. 24, 2021, which are incorporated herein in their entirety.

TECHNICAL FIELD

The present invention relates to an I/O unit, a master unit for transmitting signals to a device via the I/O unit, and a communication system (communications system) including the I/O unit and the master unit.

BACKGROUND ART

JP 2016-110460 A discloses a programmable logic controller system. The programmable logic controller system includes a base unit (master) and a plurality of expansion units (slaves). The base unit and the plurality of expansion units are daisy-chain connected together, with the master unit being at the head. Each of the plurality of expansion units is, for example, an I/O unit. The base unit transmits and receives signals to and from a controlled device via the plurality of expansion units. The controlled device is, for example, a sensor or an actuator.

SUMMARY OF THE INVENTION

The master unit and the plurality of I/O units are arranged along a predetermined installation direction with the master unit at the head. The terminal of the master unit and the terminal of the I/O unit next to each other are connected to each other. The terminals of the adjacent I/O units are connected to each other. With this configuration, the master unit and the plurality of I/O units are communicably connected to each other without separately requiring a cable or the like. Hereinafter, a group including a master unit and a plurality of I/O units which are communicably connected to each other is also referred to as a "station".

There is a limit on the number of I/O units that can be connected to (communicate with) the subsequent stage of one master unit. Therefore, when an operator wants to use the number of I/O units that exceeds the limit, the operator needs to separately prepare another station and connect the master unit of each station using a cable or the like.

Therefore, conventionally, when the number of I/O units exceeds the limit, it is difficult to make the I/O units into one station.

The present invention has the object of solving the aforementioned problems.

According to a first aspect of the present invention, there is provided an I/O unit that connects a master unit and a device and transmits a signal between the master unit and the device, the I/O unit including: a preceding-stage main-line terminal and a preceding-stage branch-line terminal configured to be connected to the master unit provided in a preceding stage of the I/O unit or another I/O unit provided in the preceding stage; a subsequent-stage branch-line terminal connected to the preceding-stage branch-line terminal and configured to be connected to another I/O unit provided in a subsequent stage of the I/O unit; a slave processing circuit connected to the preceding-stage branch-line terminal and the subsequent-stage branch-line terminal and configured to perform signal processing; and a subsequent-stage main-line terminal connected to the preceding-stage main-line terminal and configured to be connected to the other I/O unit provided in the subsequent stage or a master unit provided in the subsequent stage.

According to a second aspect of the present invention, there is provided a master unit including a master processing circuit and configured to transmit a signal, via an I/O unit, to a device connected to the I/O unit, the master unit including: a first main-line terminal configured to connect the master processing circuit and a master processing circuit located on a side of a preceding stage of the master unit, via an I/O unit provided in the preceding stage; a second main-line terminal configured to connect the master processing circuit and a master processing circuit located on a side of a subsequent stage of the master unit, via the I/O unit provided in the subsequent stage; and a branch-line terminal configured to be connected to the I/O unit provided in the subsequent stage.

According to a third aspect of the present invention, there is provided a communication system including a master unit and an I/O unit configured to transmit a signal between the master unit and a device, wherein the I/O unit includes: a preceding-stage main-line terminal and a preceding-stage branch-line terminal configured to be connected to the master unit provided in a preceding stage of the I/O unit or another I/O unit provided in the preceding stage; a subsequent-stage branch-line terminal connected to the preceding-stage branch-line terminal and configured to be connected to another I/O unit provided in a subsequent stage of the I/O unit; a slave processing circuit connected to the preceding-stage branch-line terminal and the subsequent-stage branch-line terminal and configured to perform signal processing; and a subsequent-stage main-line terminal connected to the preceding-stage main-line terminal and configured to be connected to the other I/O unit provided in the subsequent stage or the master unit provided in the subsequent stage, and wherein the master unit includes: a first main-line terminal configured to be connected to the subsequent-stage main-line terminal of the I/O unit provided in the preceding stage; a second main-line terminal configured to be connected to the preceding-stage main-line terminal of the I/O unit provided in the subsequent stage; a branch-line terminal configured to be connected to the preceding-stage branch-line terminal of the I/O unit provided in the subsequent stage; and a master processing circuit connected to the first main-line terminal, the second main-line terminal, and the branch-line terminal, and configured to perform signal processing.

According to an aspect of the present invention, it is possible to provide an I/O unit that can be added within one station. Further, it is possible to provide a master unit that allows I/O units can be added within one station. Furthermore, it is possible to provide a communication system including such I/O units and such a master unit.

BRIEF DESCRIPTION OF DRAWINGS

FIG. 3 is a diagram illustrating an interface unit according to a first modification.

DETAILED DESCRIPTION OF THE INVENTION

Preferred embodiments of an I/O unit (input/output unit), a master unit, and a communication system according to the present invention will be described in detail below with reference to the accompanying drawings.

EMBODIMENTS

Figure 1:
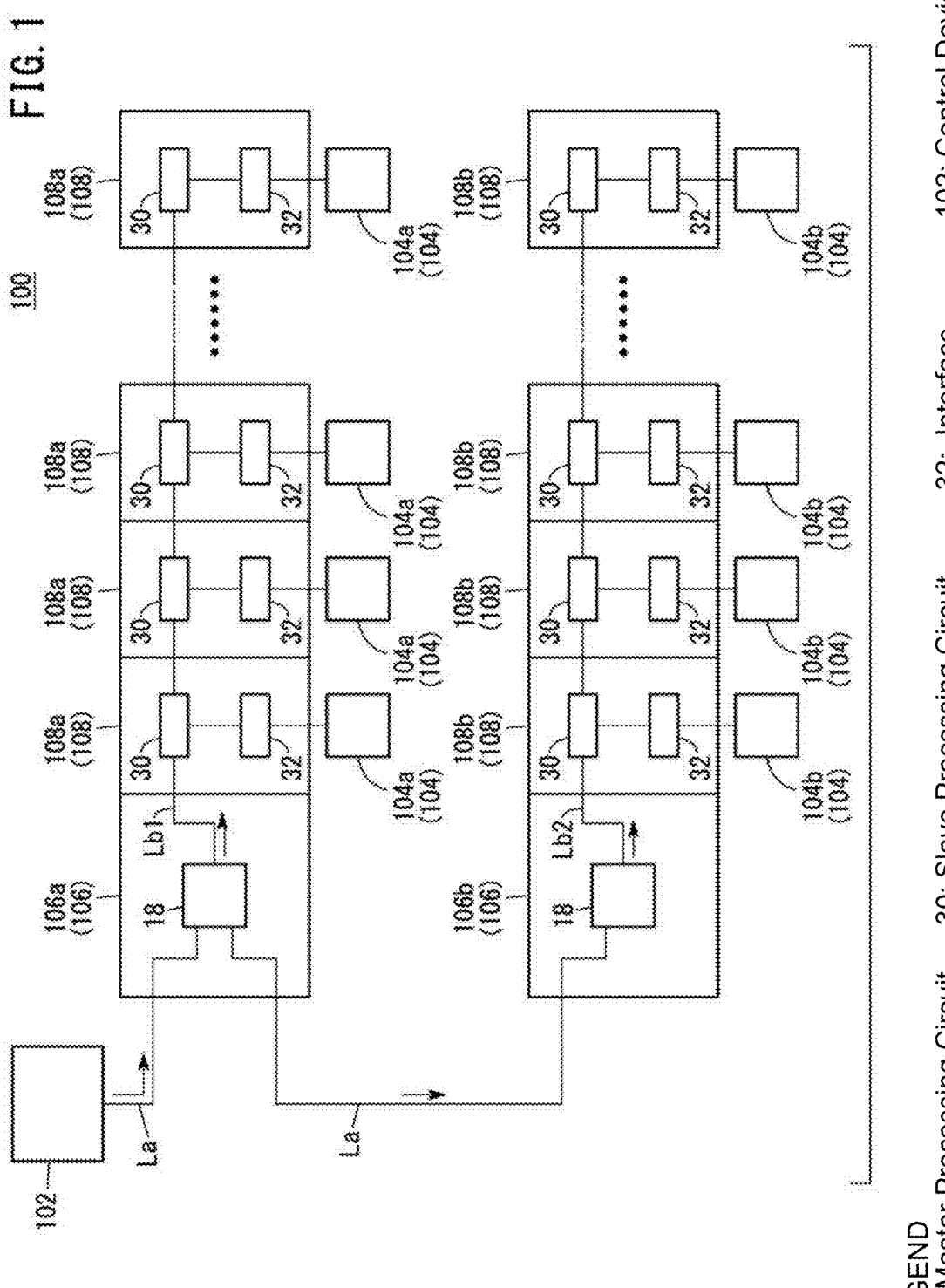
FIG. 1 is a diagram illustrating a communication system according to a reference example of the present invention.

FIG. 1 is a diagram illustrating a communication system 100 according to a reference example of the present invention.

The communication system 100 is a system that transmits signals between a control device 102 and devices 104. The device 104 is provided in a mechanical apparatus. The mechanical apparatus is, for example, a machine tool or a robot. The device 104 includes an output device 104a and an input device 104b. The output device 104a is, for example, an actuator such as a switch. When driving the output device 104a, the control device 102 sends a control signal to the output device 104a via the communication system 100. The input device 104b is, for example, a sensor that detects pressure, voltage, current, or the like. The control device 102 acquires a detection signal from the input device 104b via the communication system 100.

The communication system 100 includes a plurality of communication coupler units 106 (106a, 106b) and a plurality of I/O units 108. The I/O units 108 include a plurality of I/O units 108a and a plurality of I/O units 108b.

The control device 102, the communication coupler unit 106a, and the communication coupler unit 106b are sequentially connected in this order. As a result, a communication path (main line La) that passes through the control device 102, the communication coupler unit 106a, and the communication coupler unit 106b in this order is formed. The control device 102 and the communication coupler unit 106a are connected using a cable. Further, the communication coupler unit 106a and the communication coupler unit 106b are connected using another cable. The cables are prepared by the operator.

The plurality of I/O units 108a are sequentially connected in the subsequent stage of the communication coupler unit 106a. Thus, the communication coupler unit 106a and the plurality of I/O units 108a constitute one station. In addition, a communication path (branch line Lb1) that sequentially passes through the communication coupler unit 106a and the plurality of I/O units 108a is configured.

The plurality of I/O units 108b are sequentially connected in the subsequent stage of the communication coupler unit 106b. Thus, the communication coupler unit 106b and the plurality of I/O units 108b constitute one station. In addition, a communication path (branch line Lb2) that sequentially passes through the communication coupler unit 106b and the plurality of I/O units 108b is configured.

The plurality of I/O units 108 are connected to the plurality of devices 104. In FIG. 1, the plurality of I/O units 108 are connected to mutually different devices 104. However, a plurality of devices 104 may be connected to one I/O unit 108.

Each of the communication coupler unit 106a and the communication coupler unit 106b includes a master processing circuit 18. Each of the I/O units 108a and 108b includes a slave processing circuit 30 and an interface 32.

The slave processing circuit 30 is a circuit that performs input and output of signals with respect to the master processing circuit 18. Each of the master processing circuit 18 and the slave processing circuit 30 includes, for example, a central processing unit (CPU). However, each of the master processing circuit 18 and the slave processing circuit 30 may include, for example, an application specific integrated circuit (ASIC), a programmable logic device (PLD), a field programmable logic gate array (FPGA), or the like. The interface 32 is hardware (a circuit or an electronic component group) that transmits signals between the slave processing circuit 30 and the device 104. The interface 32 connects the slave processing circuit 30 and the device 104, and the slave processing circuit 30 performs input and output of signals with respect to the device 104. The specific configuration of the interface 32 varies depending on the type of the device 104.

The master processing circuit 18 of the communication coupler unit 106a and the master processing circuit 18 of the communication coupler unit 106b are daisy-chain connected by the main line La with the control device 102 being at the head. The slave processing circuits 30 of the plurality of I/O units 108a are daisy-chain connected by the branch line Lb1 with the master processing circuit 18 of the communication coupler unit 106a being at the head. Further, the slave processing circuits 30 of the plurality of I/O units 108b are daisy-chain connected by the branch line Lb2 with the master processing circuit 18 of the communication coupler unit 106b being at the head.

When the control device 102 transmits a control signal to the device 104, the control device 102 outputs the control signal to the communication coupler unit 106a connected to the first stage (first) as viewed from the control device 102 itself. The control signal includes address information etc. of the I/O unit 108 to which the device 104 as a transmission target is connected. The master processing circuit 18 of the communication coupler unit 106a determines whether the address information included in the control signal indicates any one of the plurality of I/O units 108a. When the address information does not indicate any one of the plurality of I/O units 108a, the master processing circuit 18 of the communication coupler unit 106a outputs a control signal to the master processing circuit 18 of the communication coupler unit 106b. When the address information indicates any one of the plurality of I/O units 108a, the master processing circuit 18 of the communication coupler unit 106a outputs the control signal to the I/O unit 108a provided in the subsequent stage of the communication coupler unit 106a itself. The slave processing circuit 30 of the I/O unit 108a that has received the control signal from the preceding stage determines whether or not the address information included in the received control signal indicates the I/O unit 108a itself. When the address information indicates the I/O unit 108a itself, the slave processing circuit 30 of the I/O unit 108a outputs the control signal to the device 104 connected to the I/O unit 108a itself. Thus, the device 104 is caused to operate. On the other hand, when the address information included in the input control signal does not indicate the I/O unit 108a itself, the I/O unit 108a outputs the control signal to an I/O unit 108a provided in the subsequent stage of the I/O unit 108a itself. When the address information included in the control signal indicates the I/O unit 108 itself, the I/O unit 108 may output the control signal to an I/O unit 108 provided in the subsequent stage. In addition, when the address information included in the control signal indicates the I/O unit 108 connected to the communication coupler unit 106 itself, the communication coupler unit 106 may output the control signal to the next communication coupler unit 106 provided in the subsequent stage.

There is a case where the device 104 may output a signal to the control device 102. In this case, the signal of the device 104 is input to the slave processing circuit 30 of the I/O unit 108 to which the device 104 is connected. The slave processing circuit 30 transmits a signal input from the device 104 connected to the slave processing circuit 30 itself, to the control device 102. In this case, the slave processing circuit 30 outputs the signal to the I/O unit 108 or the communication coupler unit 106 connected to the preceding stage of the slave processing circuit 30 itself. Here, the slave processing circuit 30 adds the content output by the device 104 and the address information of the I/O unit 108 that has output the signal, to the output signal. The input and output of signals between the communication coupler unit 106 and the I/O unit 108 is a well-known technique and thus further description thereof is omitted.

Incidentally, in the reference example, as described above, the station with the communication coupler unit 106a at the head and the station with the communication coupler unit 106b at the head are configured. There is a case where the operator may wish to place all of the necessary communication coupler units 106 and the necessary I/O units 108 together in one station.

However, as described above, a limit is set on the number of I/O units (slave processing circuits 30) 108 with which one communication coupler unit 106 can communicate in parallel. More specifically, the limit is determined based on the communication quality that can be accepted by the designer while taking into account the performance of the master processing circuit 18. At least when the number of I/O units 108 exceeds the limit determined for the master processing circuit 18, the operator is forced to install a plurality of stations.

Based on the above, embodiments will be described below. Components similar to the components described in the reference example are denoted by the same reference numerals, description thereof is omitted, and portions different from the reference example will be mainly described.

Figure 2:
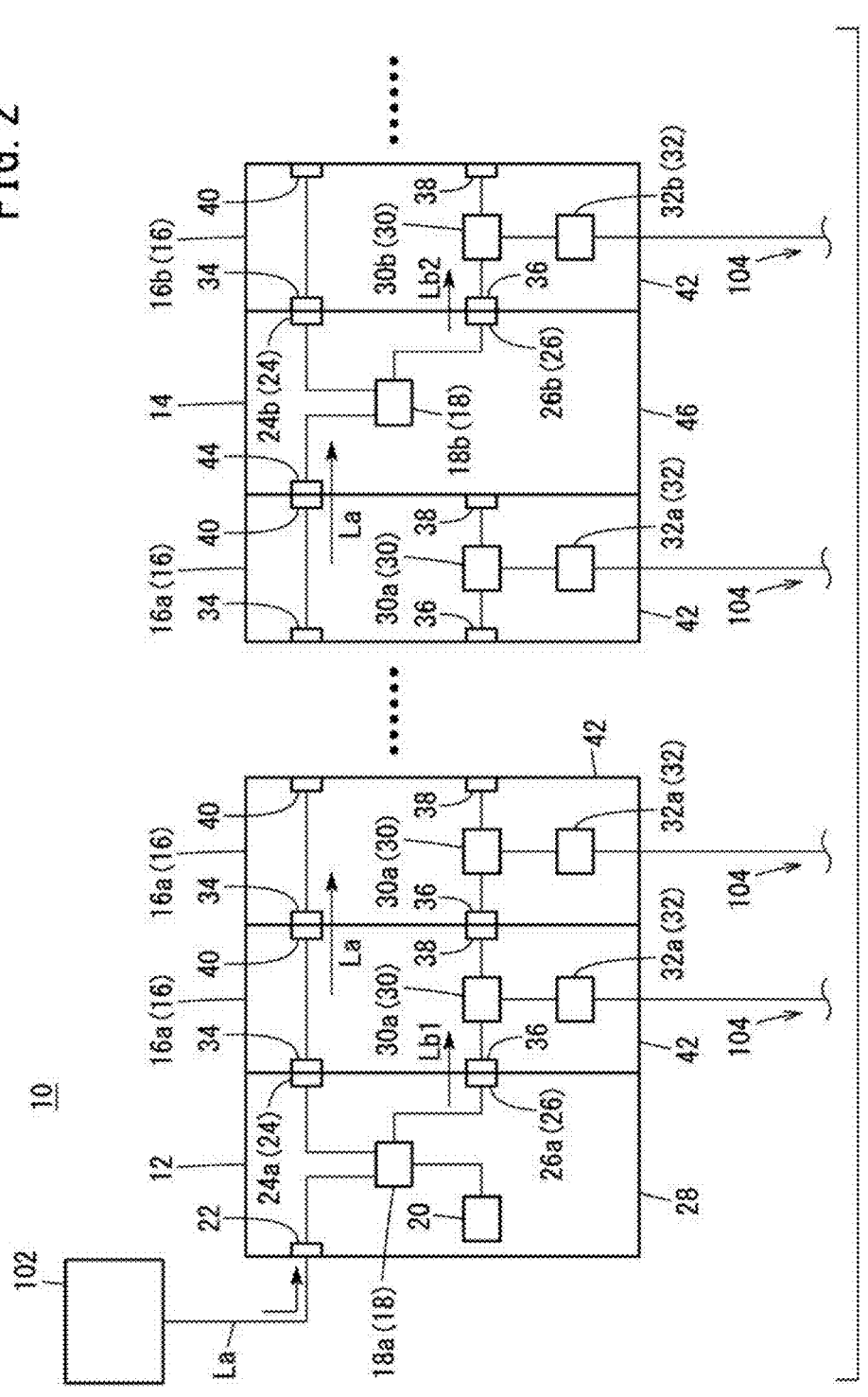
FIG. 2 is a diagram illustrating a communication system according to an embodiment of the present invention.

FIG. 2 is a diagram illustrating a communication system 10 according to an embodiment of the present invention. In FIG. 2, a slave processing circuit 30 is also referred to as a slave processing circuit 30a or a slave processing circuit 30b, depending on whether the slave processing circuit 30 belongs to the branch line Lb1 or the branch line Lb2. Similarly, an interface 32 is also described as an interface 32a or an interface 32b, depending on whether the interface 32 belongs to the branch line Lb1 or the branch line Lb2.

As illustrated in FIG. 2, the communication system 10 is a system including a plurality of master units and a plurality of slave units that are slaves of the plurality of master units. More specifically, the communication system 10 includes a communication coupler unit 12, an interface unit 14, and a plurality of I/O units 16.

Each of the communication coupler unit 12 and the interface unit 14 is a master unit in the communication system 10. On the other hand, each of the plurality of I/O units 16 is a slave unit in the communication system 10. In FIG. 2, the I/O units 16 serving as slave units of the communication coupler unit 12 are I/O units 16a. In FIG. 2, the I/O units 16 serving as slave units of the interface unit 14 are I/O units 16b.

The communication coupler unit 12 includes a master processing circuit 18 (18a), a power supply 20, a connector 22, a terminal 24 (24a), a terminal 26 (26a), and a housing

28. The master processing circuit 18a, the power supply 20, the connector 22, the terminal 24a and the terminal 26a are housed in the housing 28.

The power supply 20 supplies electric power to the master processing circuit 18a. However, the power supply 20 may supply electric power to the interface unit 14 or the I/O units 16 connected to the subsequent stage of the communication coupler unit 12.

The connector 22 is a connector for connecting to the control device 102, another communication coupler unit 12, or the communication coupler unit 106 (FIG. 1). In the example of FIG. 2, the connector 22 is connected to the control device 102. The connector 22 is connected to the master processing circuit 18a. Thus, in the example of FIG. 2, the master processing circuit 18a is connected to the control device 102 through the connector 22.

The terminal 24a and the terminal (branch-line terminal) 26a are terminals for connection to the I/O unit 16 provided in the subsequent stage. Each of the terminals 24a and 26a is connected to the master processing circuit 18a. Therefore, the master processing circuit 18a is interposed between the connector 22 and the terminal 24a. Similarly, the master processing circuit 18a is interposed between the connector 22 and the terminal 26a.

The interface unit 14 includes a master processing circuit 18 (18b), a terminal 24 (24b), a terminal 26 (26b), a terminal 44, and a housing 46. The master processing circuit 18b, the terminal 24b, the terminal 26b, and the terminal 44 are housed in the housing 46.

The terminals 24b and 26b are terminals for connection to the I/O unit 16 provided in the subsequent stage. The terminal 44 is a terminal for connection to the I/O unit 16 provided in the preceding stage of the interface unit 14. Each of the terminals 24b and 26b is connected to the master processing circuit 18b. The terminal (first main-line terminal) 44 is connected to the master processing circuit 18b. Therefore, the master processing circuit 18b is interposed between the terminals 44 and 24b. Similarly, the master processing circuit 18b is interposed between the terminals 44 and 26b.

The I/O unit 16 includes a slave processing circuit 30, an interface 32, a terminal (preceding-stage main-line terminal) 34, a terminal (preceding-stage branch-line terminal) 36, a terminal (subsequent-stage branch-line terminal) 38, a terminal (subsequent-stage main-line terminal) 40, and a housing 42. The slave processing circuit 30, the interface 32, the terminal (preceding-stage main-line terminal) 34, the terminal (preceding-stage branch-line terminal) 36, the terminal (subsequent-stage branch-line terminal) 38, and the terminal (subsequent-stage main-line terminal) 40 are accommodated in the housing 42.

Each of the terminal 34 and the terminal 36 is a terminal for connection to the communication coupler unit 12 provided in the preceding stage, the interface unit 14 provided in the preceding stage, or another I/O unit 16 provided in the preceding stage. The terminal 36 is connected to the slave processing circuit 30.

When the I/O unit 16 is provided in the subsequent stage of the communication coupler unit 12, the terminal 34 of the I/O unit 16 (16a) and the terminal 24a of the communication coupler unit 12 are connected to each other, and the terminal 36 and the terminal 26a are connected to each other. Here, the master processing circuit 18a of the communication coupler unit 12 and the slave processing circuit 30 of the I/O unit 16a are connected to each other via the terminals 26a and 36. When the I/O unit 16 is provided in the subsequent stage of the interface unit 14, the terminal 34 of the I/O unit 16 (16b) is connected to the terminal 24b of the interface unit 14, and the terminal 36 is connected to the terminal 26b. Here, the master processing circuit 18b of the interface unit 14 and the slave processing circuit 30 of the I/O unit 16b are connected through the terminals 26b and 36.

The terminal 38 is a terminal for connection to another I/O unit 16 provided in the subsequent stage. The terminal 38 is connected to the terminal 36 via the slave processing circuit 30.

The terminal 40 is a terminal for connection to another I/O unit 16 provided in the subsequent stage or the interface unit 14 provided in the subsequent stage. The terminal 40 is connected to the terminal 34. Here, the terminal 34 and the terminal 40 are connected not via the slave processing circuit 30. That is, the terminal 34 and the terminal 40 are connected to each other in a state of being electrically disconnected from the slave processing circuit 30.

When another I/O unit 16 (a subsequent-stage I/O) is provided in the subsequent stage of the I/O unit 16 (the preceding-stage I/O), the terminal 38 of the preceding-stage I/O and the terminal 36 of the subsequent-stage I/O are connected. Also, the terminal 40 of the preceding-stage I/O and the terminal 34 of the subsequent-stage I/O are connected. Here, the slave processing circuit 30 of the preceding-stage I/O and the slave processing circuit 30 of the subsequent-stage I/O are connected through the terminal 38 of the preceding-stage I/O and the terminal 36 of the subsequent-stage I/O.

As shown in FIG. 2, when the interface unit 14 is provided in the subsequent stage of the I/O unit 16a, the terminal 40 of the I/O unit 16a and the terminal 44 of the interface unit 14 are connected to each other. Here, the terminal 44 is connected to the terminal 24a of the communication coupler unit 12 through the I/O unit 16a (a plurality of the I/O units 16a). As described above, the terminal 44 is connected to the master processing circuit 18b. Further, the terminal 24a is connected to the master processing circuit 18a. Therefore, the master processing circuit 18b is connected (daisy-chain connected) to the master processing circuit 18a. The slave processing circuit 30 is not interposed between the master processing circuit 18b and the master processing circuit 18a.

As described above, according to the present embodiment, even if the number of I/O units 16 exceeds the limit determined for the communication coupler unit 12 (master processing circuit 18a), the operator can connect the excess I/O units 16b to the interface unit 14. The connection between the master processing circuit 18a of the communication coupler unit 12 and the master processing circuit 18b of the interface unit 14 is performed within one station through the I/O unit 16a (a plurality of the I/O units 16a). The operator can arrange all of the necessary I/O units 16 together in one station by providing the interface unit 14 as needed.

Note that another interface unit 14 and other I/O units 16 may be sequentially connected to the further subsequent stage of the I/O unit 16 provided in the subsequent stage of the interface unit 14. That is, the master processing circuit 18b of the interface unit 14 may be connected to the master processing circuit 18 provided in the further subsequent stage, through the terminals 34 and the terminals 40 of one or more I/O units 16.

MODIFICATIONS

The embodiment has been described above as one example of the present invention. It is noted that various modifications or improvements are capable of being added to the above-described embodiment. Further, it is clear from the scope of the claims that other modes to which such modifications or improvements have been added can be included within the technical scope of the present invention.

Hereinafter, exemplary modifications according to the embodiment will be described. However, explanations that overlap with those of the embodiment will be omitted insofar as possible in the following description. Components that have already been described in the above embodiment are denoted by the same reference numerals as in the above embodiment unless otherwise indicated.

Modification 1

In the embodiment, the terminal 24b and the terminal 44 of the interface unit 14 are connected via the master processing circuit 18b. However, the configuration of the interface unit 14 is not limited to this.

FIG. 3 is a diagram illustrating an interface unit 14A (14) according to a first modification. In FIG. 3, in addition to the interface unit 14A, the I/O unit 16a on the preceding stage and the I/O unit 16b on the subsequent stage are shown.

The terminal 24b and the terminal 44 of the interface unit 14A may be connected by a first signal line 48. The first signal line 48 and the master processing circuit 18b of the interface unit 14A may be connected to each other by a second signal line 50.

Modification 2

The terminal 38 is connected to the slave processing circuit 30, and the terminal 36 is connected to the slave processing circuit 30. However, the terminal 38 and the terminal 36 may be connected to each other not via the slave processing circuit 30. For example, the terminal 38 and the terminal 36 may be connected to each other by a signal line, and the signal line and the slave processing circuit 30 may be connected to each other by another signal line.

INVENTIONS THAT CAN BE OBTAINED FROM THE EMBODIMENT

The inventions that can be grasped from the above-described embodiment and the modifications thereof will be described below.

First Invention

A first invention is characterized by the I/O unit (16) that connects the master unit (12, 14) and the device (104) and transmits a signal between the master unit (14) and the device, the I/O unit (16) including: the preceding-stage main-line terminal (34) and the preceding-stage branch-line terminal (36) configured to be connected to the master unit (12, 14) provided in the preceding stage of the I/O unit or another I/O unit (16) provided in the preceding stage; the subsequent-stage branch-line terminal (38) connected to the preceding-stage branch-line terminal and configured to be connected to another I/O unit (16) provided in the subsequent stage of the I/O unit; the slave processing circuit (30) connected to the preceding-stage branch-line terminal and the subsequent-stage branch-line terminal and configured to perform signal processing; and the subsequent-stage main-line terminal (40) connected to the preceding-stage main-line terminal and configured to be connected to the other I/O unit provided in the subsequent stage or the master unit (14) provided in the subsequent stage.

This provides an I/O unit that can be added within one station.

The subsequent-stage branch-line terminal may be connected to the preceding-stage branch-line terminal of the other I/O unit provided in the subsequent stage, whereby a plurality of the slave processing circuits may be daisy-chain connected to each other.

In the first invention, the preceding-stage main-line terminal may be connected to the master processing circuit (18) of the master unit provided in the preceding stage, and the subsequent-stage main-line terminal may be connected to the master processing circuit (18) of the master unit (14) provided in the subsequent stage, whereby a plurality of the master processing circuits may be daisy-chain connected to each other.

The I/O unit may further include the interface (32) configured to connect the slave processing circuit and the device and allow the slave processing circuit to perform input and output of a signal with respect to the device.

Second Invention

A second invention is characterized by the master unit (14) including the master processing circuit (18) and configured to transmit a signal, via the I/O unit (16), to the device (104) connected to the I/O unit, the master unit (14) including: the first main-line terminal (44) configured to connect the master processing circuit and the master processing circuit (18) located on the preceding stage side of the master unit, via the I/O unit provided in the preceding stage; the second main-line terminal (24) configured to connect the master processing circuit and the master processing circuit (18) located on the subsequent stage side of the master unit, via the I/O unit (16) provided in the subsequent stage; and the branch-line terminal (26) configured to be connected to the I/O unit provided in the subsequent stage.

This provides a master unit that allows an I/O unit to be added within one station.

Third Invention

A third invention is characterized by the communication system (10) including the master unit (12, 14) and the I/O unit (16) configured to transmit a signal between the master unit and the device (104), wherein the I/O unit includes: the preceding-stage main-line terminal (34) and the preceding-stage branch-line terminal (36) configured to be connected to the master unit provided in the preceding stage of the I/O unit or another I/O unit (16) provided in the preceding stage; the subsequent-stage branch-line terminal (38) connected to the preceding-stage branch-line terminal and configured to be connected to another I/O unit (16) provided in the subsequent stage of the I/O unit; the slave processing circuit (30) connected to the preceding-stage branch-line terminal and the subsequent-stage branch-line terminal and configured to perform signal processing; and the subsequent-stage main-line terminal (40) connected to the preceding-stage main-line terminal and configured to be connected to the other I/O unit provided in the subsequent stage or the master unit (14) provided in the subsequent stage, and wherein the master unit (14) includes: the first main-line terminal (44) configured to be connected to the subsequent-stage main-line terminal of the I/O unit provided in the preceding stage; the second main-line terminal (24) configured to be connected to the preceding-stage main-line terminal of the I/O unit provided in the subsequent stage; the branch-line terminal (26) configured to be connected to the preceding-stage branch-line terminal of the I/O unit provided in the subsequent stage; and the master processing circuit (18) connected to the first main-line terminal, the second main-line terminal, and the branch-line terminal, and configured to perform signal processing.

Thus, a communication system is provided in which more I/O units can be added within one station.

The I/O unit may further include the interface (32) configured to connect the slave processing circuit and the device and allow the slave processing circuit to perform input and output of a signal with respect to the device.

The invention claimed is:

1. An I/O unit that connects a master unit and a device and transmits a signal between the master unit and the device, the I/O unit comprising:

a preceding-stage main-line terminal and a preceding-stage branch-line terminal configured to be connected to a first master unit that is a master unit provided in a preceding stage of the I/O unit or to another I/O unit provided in the preceding stage;

a subsequent-stage branch-line terminal connected to the preceding-stage branch-line terminal and configured to be connected to another I/O unit provided in a subsequent stage of the I/O unit;

a slave processing circuit connected to the preceding-stage branch-line terminal and the subsequent-stage branch-line terminal and configured to perform signal processing; and a subsequent-stage main-line terminal connected to the preceding-stage main-line terminal and configured to be connected to the other I/O unit provided in the subsequent stage or a second master unit that is a master unit provided in the subsequent stage, wherein the preceding-stage main-line terminal and a main-line terminal provided in the first master unit touches each other, and in a case where the subsequent-stage main-line terminal and a main-line terminal provided in the second master unit touches each other, a first master processing circuit provided in the first master unit and a second master processing circuit provided in the second master unit are connected with each other via the preceding-stage main-line terminal and the subsequent-stage main-line terminal, and in a case where the subsequent-stage main-line terminal and the main-line terminal provided in the second master unit touches each other, the subsequent-stage branch-line terminal is not connected to any of the second master processing circuit, a third master unit provided in a subsequent stage of the second master unit, or the other I/O unit provided in the subsequent stage of the second master unit.

2. The I/O unit according to claim 1, wherein the subsequent-stage branch-line terminal is connected to the preceding-stage branch-line terminal of the other I/O unit provided in the subsequent stage, whereby a plurality of the slave processing circuits are daisy-chain connected to each other.

3. The I/O unit according to claim 1, wherein the preceding-stage main-line terminal is connected to a master processing circuit of the first master unit and the subsequent-stage main-line terminal is connected to a master processing circuit of the second master unit, whereby a plurality of the master processing circuits are daisy-chain connected to each other.

4. The I/O unit according to claim 1, further comprising an interface configured to connect the slave processing circuit and the device and allow the slave processing circuit to perform input and output of a signal with respect to the device.

5. A master unit including a first master processing circuit that is a master processing circuit, and configured to transmit a signal, via an I/O unit, to a device connected to the I/O unit, the master unit comprising:

a first main-line terminal configured to connect the first master processing circuit and a second master processing circuit that is a master processing circuit located on a side of a preceding stage of the master unit, via a first I/O unit that is an I/O unit provided in the preceding stage;

a second main-line terminal configured to connect the first master processing circuit and a third master processing circuit that is a master processing circuit located on a side of a subsequent stage of the master unit, via a second I/O unit that is an I/O unit provided in the subsequent stage; and a branch-line terminal configured to be connected to the second I/O unit, wherein the first main-line terminal and a subsequent-stage main-line terminal provided in the first I/O unit touches each other, whereby the first master processing circuit and the second master processing circuit located on a side of a preceding stage of the first I/O unit are connected with each other, the second main-line terminal and a preceding-stage main-line terminal provided in the second I/O unit touches each other, whereby the first master processing unit and a third master processing unit located on a side of a subsequent stage of the second I/O unit are connected with each other, and in a case where the first main-line terminal and the subsequent-stage main-line terminal provided in the first I/O unit touches each other, any of the first master processing circuit or the branch-line terminal is not connected to the first I/O unit.

6. A communication system comprising a master unit and an I/O unit configured to transmit a signal between the master unit and a device, wherein the I/O unit includes:

a preceding-stage main-line terminal and a preceding-stage branch-line terminal configured to be connected to a first master unit that is a master unit provided in a preceding stage of the I/O unit or another I/O unit provided in the preceding stage;

a subsequent-stage branch-line terminal connected to the preceding-stage branch-line terminal and configured to be connected to another I/O unit provided in a subsequent stage of the I/O unit;

a slave processing circuit connected to the preceding-stage branch-line terminal and the subsequent-stage branch-line terminal and configured to perform signal processing; and a subsequent-stage main-line terminal connected to the preceding-stage main-line terminal and configured to be connected to the other I/O unit provided in the subsequent stage or a second master unit that is a master unit provided in the subsequent stage, and wherein the master unit includes:

a first main-line terminal configured to be connected to the subsequent-stage main-line terminal of the I/O unit provided in the preceding stage;

a second main-line terminal configured to be connected to the preceding-stage main-line terminal of the I/O unit provided in the subsequent stage;

a branch-line terminal configured to be connected to the preceding-stage branch-line terminal of the I/O unit provided in the subsequent stage; and a master processing circuit connected to the first main-line terminal, the second main-line terminal, and the branch-line terminal, and configured to perform signal processing, wherein in a case where the preceding-stage main-line terminal and the second main-line terminal provided in the first master unit touches each other, and the subsequent-stage main-line terminal and the first main-line terminal provided in the second master unit touches each other, a first master processing circuit provided in the first master unit and a second master processing circuit provided in the second master unit are connected with each other via the preceding-stage main-line terminal and the subsequent-stage main-line terminal, and in a case where the subsequent-stage main-line terminal and the main-line terminal provided in the second master unit touches each other, the subsequent-stage branch-line terminal is not connected to any of the second master processing circuit, a third master unit provided in a subsequent stage of the second master unit, or the other I/O unit provided in the subsequent stage of the second master unit.

7. The communication system according to claim 6, wherein the I/O unit further includes an interface configured to connect the slave processing circuit and the device and allow the slave processing circuit to perform input and output of a signal with respect to the device.

\* \* \* \* \*